(12) United States Patent
Yang et al.

(10) Patent No.: US 9,176,338 B2
(45) Date of Patent: Nov. 3, 2015

(54) LIQUID CRYSTAL DISPLAY PANEL AND METHOD FOR MANUFACTURING THE SAME

(71) Applicant: XIAMEN TIANMA MICRO_ELECTRONICS CO., LTD., Xiamen (CN)

(72) Inventors: Kangpeng Yang, Xiamen (CN); Yuan Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 187 days.

(21) Appl. No.: 13/861,350

(22) Filed: Apr. 11, 2013

(65) Prior Publication Data

US 2014/0211134 A1    Jul. 31, 2014

(30) Foreign Application Priority Data

Jan. 28, 2013   (CN) .......................... 2013 1 0032342

(51) Int. Cl.
*G02F 1/1333*   (2006.01)
*G02F 1/1335*   (2006.01)

(52) U.S. Cl.
CPC .... *G02F 1/133382* (2013.01); *G02F 1/133514* (2013.01); *G02F 2001/133334* (2013.01)

(58) Field of Classification Search
CPC .................. G02F 1/133382; G02F 1/133514; G02F 2001/133334
USPC .......................................................... 349/161
See application file for complete search history.

(56) References Cited

U.S. PATENT DOCUMENTS 6,433,476 B1 *   8/2002  Pacicrek et al. ............... 313/509
2008/0309865 A1 *  12/2008  Sugita et al. .................. 349/150

FOREIGN PATENT DOCUMENTS

CN    201594162 U    9/2010
CN    102004505 A    4/2011

* cited by examiner

*Primary Examiner* — Nathanael R Briggs
(74) *Attorney, Agent, or Firm* — Alston & Bird LLP

(57) ABSTRACT

An LCD panel and a method for manufacturing the LCD panel are disclosed. The LCD panel comprises: an array substrate, a color filter substrate, and a liquid crystal layer filled between the array substrate and the color filter substrate. The color filter substrate comprises: a transparent conductive metal oxide film, and first and second conductive metal strips electrically connected with the transparent conductive metal oxide film. The first and second conductive metal strips are configured to conduct a current, which flows through the transparent conductive metal oxide film, causing the transparent conductive metal oxide film to heat the liquid crystal layer.

18 Claims, 4 Drawing Sheets

LIQUID CRYSTAL DISPLAY PANEL AND METHOD FOR MANUFACTURING THE SAME

CROSS-REFERENCES TO RELATED APPLICATIONS

This application claims priority to Chinese patent application No. 201310032342.7 filed on Jan. 28, 2013 and entitled "Liquid Crystal Display Panel and Method For Manufacturing The Same", which is incorporated herein by reference in its entirety.

FIELD OF THE INVENTION

The field relates to a Liquid Crystal Display (LCD), and more particularly, to an LCD panel and a method for manufacturing the LCD panel.

BACKGROUND OF THE INVENTION

A liquid crystal has both a birefringence characteristic of a crystal and a liquid fluidity characteristic of a liquid. A Liquid Crystal Display (LCD) is a display device which operates based on an optical property of a liquid crystal molecule changing under the effect of an external electric field. Various types of LCDs are used, and have been widely applied to a variety of displays and electronic instruments. However, due to a material limitation of a liquid crystal, the response time of the liquid crystal is high at a low temperature. The increased response time of the liquid crystal deteriorates an image display quality, resulting in streaking and smears of a dynamic image. If the temperature drops enough (e.g. below −30° C.), the orientation layer of the display device will crystallize due to the nonexistence of the liquid crystal state, thus an image cannot be displayed due to the loss of the liquid crystal liquid characteristic.

In order to solve the above problems, a heater may be employed to heat the LCD screen in the prior art. For example, Chinese patent No. CN2503560Y discloses a liquid crystal display module which functions normally under a ultralow temperature. The display module includes a printed circuit board, an LED backlight, a liquid crystal display, and a heater provided between the LED backlight and the liquid crystal display, where the heater is a glass plate with a transparent conductive film, and electrodes are arranged adjacent to both short sides of the glass plate and may be inserted into insertion holes at both lateral sides of the printed circuit board.

In the prior art, the heater provided between the backlight and the liquid crystal display device increases the thickness of the liquid crystal display module and the structural complexity.

Further in the use of the liquid crystal display, after the voltage applied on the liquid crystal cell is removed, the electric field in the liquid crystal cell will not disappear instantaneously due to electrostatic induction, and pixels are still at least partly in the display state.

Many manufacturers add an antistatic agent is into the liquid crystal to reduce the residual time, but the antistatic agent reduces the reliability of the liquid crystal display due to the addition of foreign matters into the liquid crystal. In addition, other methods for reducing the static electricity may also increase the structural complexity.

In view of the increasing demands for light-weight, thin, short and small electronic products, there is a need for liquid crystal display devices that are more compact in the structure to reduce the weight and function properly at low temperatures.

BRIEF SUMMARY OF THE INVENTION

One implementation is a liquid crystal display panel, including an array substrate, a color filter substrate arranged connected to the array substrate, and a liquid crystal layer filled between the array substrate and the color filter substrate. The color filter substrate includes a transparent conductive metal oxide film on a surface opposite the liquid crystal layer, and first and second conductive metal strips electrically connected with the transparent conductive metal oxide film. The first and second conductive metal strips are configured to conduct a current, which flows through the transparent conductive metal oxide film, and the current causes the transparent conductive metal oxide film to generate heat.

Another implementation is a method of manufacturing a liquid crystal display panel. The method includes providing an array substrate, connecting a color filter substrate to the array substrate, and filling a liquid crystal between the array substrate and the color filter substrate to form a liquid crystal layer. The color filter substrate includes a transparent conductive metal oxide film on a surface opposite the liquid crystal layer, and first and second conductive metal strips electrically connected with the transparent conductive metal oxide film. The first and second conductive metal strips are configured to conduct a current, which flows through the transparent conductive metal oxide film, and the current causes the transparent conductive metal oxide film to generate heat.

Another implementation is a method of heating a liquid crystal display panel, where the panel includes a liquid crystal layer and a color filter substrate including a transparent conductive metal oxide film, and first and second conductive metal strips electrically connected with the transparent conductive metal oxide film. The method includes, providing the liquid crystal display panel with a driving signal through an external circuit, the external circuit transmitting the driving signal through the first and second conductive metal strips to the transparent conductive metal oxide film, whereby the transparent conductive metal oxide film heats the liquid crystal layer.

DETAILED DESCRIPTION

Various features, aspects, and principles are described in detail below with reference to the accompanying drawings. It should be understood that the embodiments described herein are intended merely to explain but not limit the described embodiments. In addition, it should be further noted that the accompanying drawings illustrate structures associated with the invention, but do not illustrate all possible structures.

Certain embodiments provide a liquid crystal display panel, which includes: an array substrate, a color filter substrate arranged opposite to the array substrate, and a liquid crystal layer formed between the array substrate and the color filter substrate.

Figure 1:
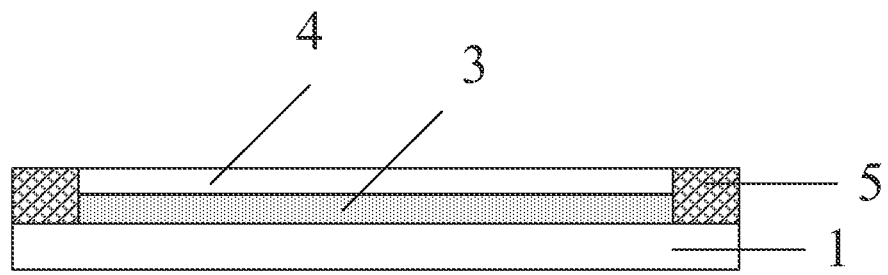
FIG. 1 is a schematic view of a color filter substrate according to an embodiment of the invention.
Figure 2:
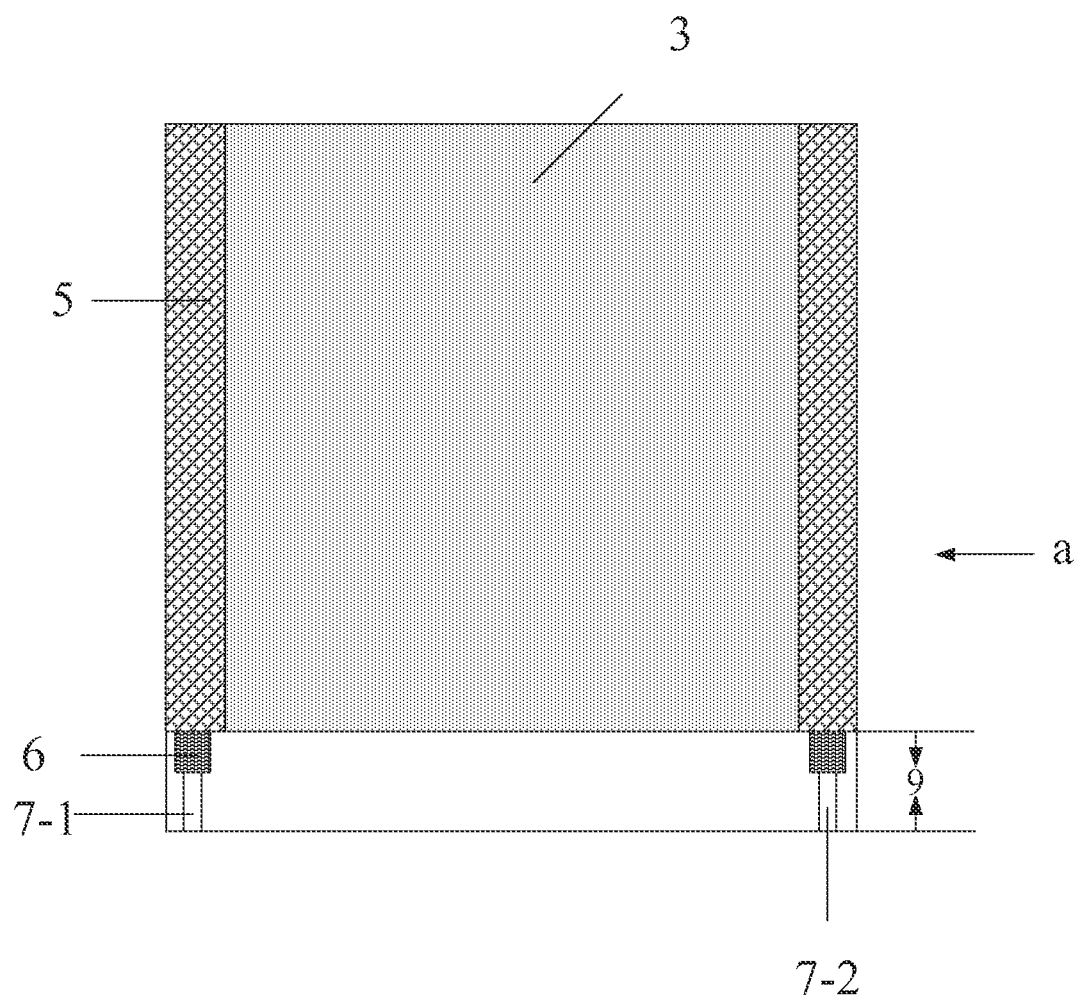
FIG. 2 is a top view of the liquid crystal display panel according to the embodiment of the invention.
Figure 3:
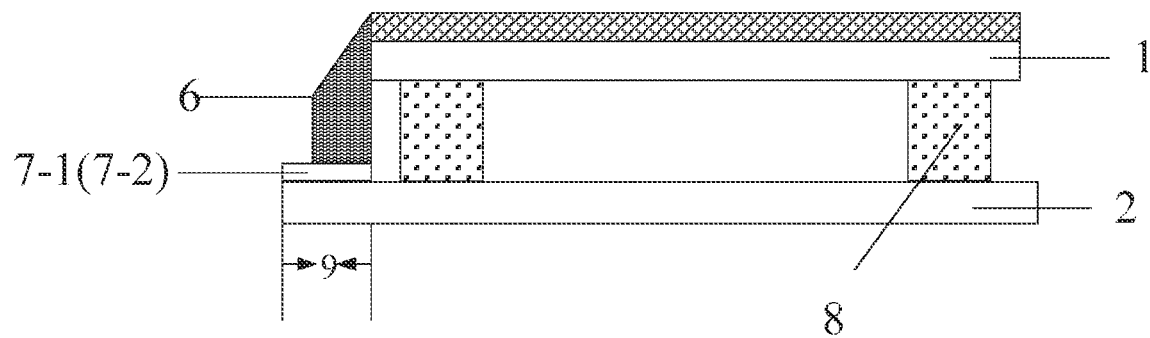
FIG. 3 is a cross-sectional view of the liquid crystal display panel according to the embodiment of the invention.

FIG. 1 is a schematic view of a color filter substrate 1. FIG. 2 is a top view of a liquid crystal display panel, and FIG. 3 is a cross-sectional view of the liquid crystal display panel taken along a direction in FIG. 2.

As shown in FIGS. 1 and 2, a transparent conductive metal oxide film 3 lies on the surface of the color filter substrate 1 that is opposite the liquid crystal layer (not shown). The transparent conductive metal oxide film 3 may, for example, any one of or any combination of indium tin oxide (ITO), zinc oxide (ZnO), indium zinc oxide (IZO) and aluminum zinc oxide (AZO), and preferably ITO. Two conductive metal strips 5, which are separated from each other, are arranged adjacent to both lateral sides of the transparent conductive metal oxide film 3, respectively, and electrically connected to the transparent conductive metal oxide film 3. Current may be allowed to flow through the transparent conductive metal oxide film 3 via the conductive metal strips 5. The conductive metal strips 5 may, for example, be made of silver paste or a titanium aluminum alloy. In some embodiments, the width of the conductive metal strip 5 is within a range from about 0.5 mm to about 1.0 mm. In some embodiments, a polarizer 4 is formed on the surface of the transparent conductive metal oxide film 3 that is away from the color filter substrate 1. In some embodiments, the polarizer 4 only covers the transparent conductive metal oxide film 3, as shown in FIG. 1.

Because a current flowing through a resistive conductor generates heat, the transparent conductive metal oxide film 3 positioned between the color filter substrate 1 and the polarizer 4 may function as a heating plate, which heats the liquid crystal display panel to enhance the display performance of the liquid crystal display panel at low temperatures. In addition, the transparent conductive metal oxide film 3 conducts static electricity so as to enhance the liquid crystal display panels resistance to static electricity. The conductive metal strips 5 provided adjacent to both sides of the transparent conductive metal oxide film 3 are used for current transmission, so that current is allowed to flow through the transparent conductive metal oxide film via the conductive metal strips 5. As a result, the liquid crystal display panel is heated, such that the image display quality and the problems of streaking and smears of the dynamic image caused by the increased response time of the liquid crystal at a low temperature will be avoided.

Figure 4:
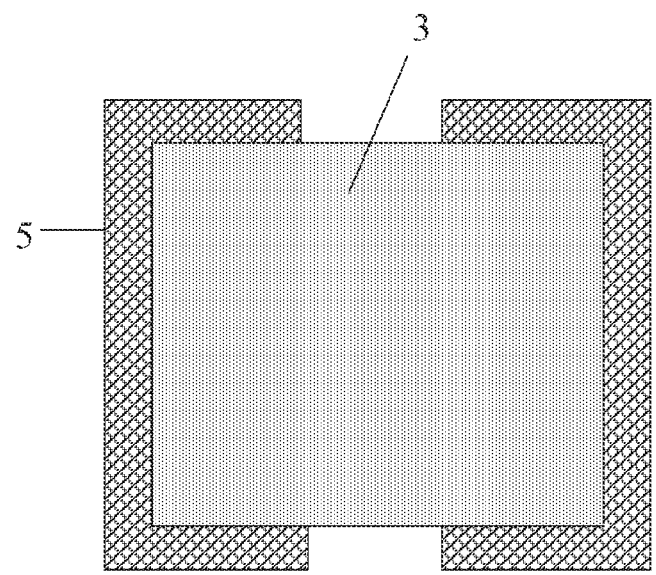
FIG. 4 is a top view of another color filter substrate according to an embodiment of the invention.

It is noted that FIGS. 1 and 2 illustratively show an embodiment where the conductive metal strips 5 are provided adjacent to lateral sides of the transparent conductive metal oxide film 3. In some embodiments, the conductive metal strips 5 are provided on other portions, for example, at the edge of the transparent conductive metal oxide film 3. In such embodiments, the conductive metal strips 5 include two separate portions each connected to the transparent conductive metal oxide film 3 to provide current which flows through the transparent conductive metal oxide film 3. FIG. 4, for example, schematically shows a top view of another color filter substrate arrangement.

Further, with reference to FIGS. 2 and 3, a stage portion 9 may be included on the array substrate 2. The stage portion 9 corresponds to a region of the array substrate 2 which extends beyond the color filter substrate 1. The stage portion 9 may be provided with heating electrodes 7-1 and 7-2, and may also include a driving chip in another embodiment. The heating electrodes 7-1 and 7-2 are connected electrically with the conductive metal strips 5 on the color filter substrate 1 through a conductive metal 6, and a current output by the heating electrodes 7-1 or 7-2 flows through the transparent conductive metal oxide film 3 via the conductive metal strips 5 for the purpose of heating the transparent conductive metal oxide film 3.

Further, the liquid crystal display panel may receive a driving signal from an external circuit, which transmits the driving signal to the liquid crystal display panel through the heating electrode for the purpose of heating the transparent conductive metal oxide film 3. Specifically, in this embodiment, the heating electrodes 7-1 and 7-2 are connected electrically with the external circuit which provides a driving voltage or current signal for the liquid crystal display panel. In response to the driving signal, current flows through the transparent conductive metal oxide film 3 via the heating electrodes 7-1 and 7-2. In some embodiments, the external circuit may be a flexible printed circuit (FPC).

The electrical connection and signal transmission between the color filter substrate 1 and the array substrate 2 may be implemented through the conductive metal 6 and the heating electrodes 7-1 and 7-2. The conductive metal 6 may comprise any one or any alloy of titanium, aluminum, copper, molybdenum, silver, etc., and may comprise silver paste.

For example, in the case that the driving signal is provided to the liquid crystal display panel by the flexible printed circuit, the driving signal is transmitted to the liquid crystal display panel through the heating electrodes to heat the liquid crystal display panel. The flexible printed circuit provides the current for one of the heating electrodes 7-1 (or 7-2), from which the current flows out to a conductive metal strip 5 on the side of the one heating electrode 7-1 (or 7-2) through the conductive metal 6 electrically connected to the conductive metal strip 5. The current is then transmitted to the transparent conductive metal oxide film 3 through the conductive metal strip 5. The current flows out of the transparent conductive metal oxide film 3 through the other conductive metal strip 5 on the other side and flows to the other heating electrode 7-2 (or 7-1) through the other conductive metal 6 connected electrically with the other conductive metal strip 5. The current flows evenly through the entire transparent conductive metal oxide film 3 due to the existence of the conductive metal strips 5, such that the transparent conductive metal oxide film 3 can generate heat evenly, thereby improving the heating effect.

Figure 5:
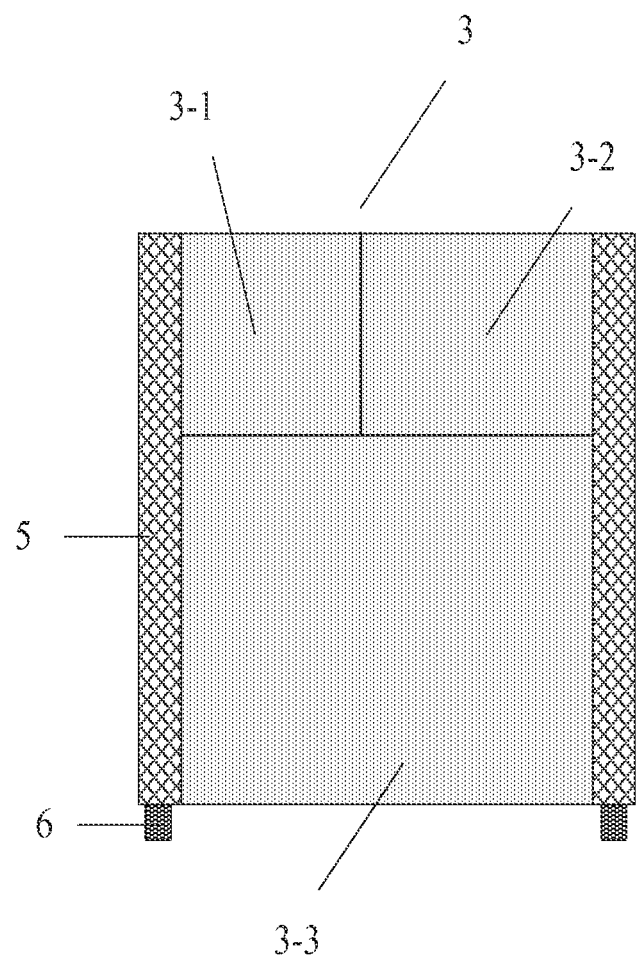
FIG. 5 is a top view of a heating plate according to an embodiment of the invention.
Figure 6:
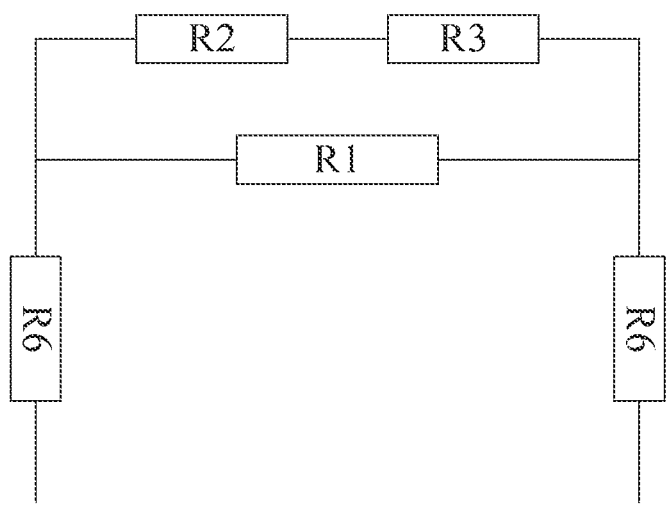
FIG. 6 is a schematic circuit diagram of equivalent resistance of a specific heating plate.

As shown in FIG. 5, the transparent conductive metal oxide film 3 may consist of multiple portions, for example, three portions 3-1, 3-2 and 3-3, which are of resistances R1, R2 and R3, respectively. In addition, the resistance of the conductive metal strip 5 on each side is R6. In this case, the equivalent circuit diagram of the of the portion of the panel heating system consisting of the transparent conductive metal oxide film 3 and the conductive metal strips 5 thereon is illustrated in FIG. 6. When a voltage (e.g. 12V) is applied across the heating electrodes, the value of the resistance R of the entire panel is $R=2*R6+1/(1/R1+1/(R2+R3))$, thus the entire panel is provided with heat Q according to the equivalent resistance R, where $Q=(U^2/R)T$, where U represents the voltage (for example, 12V) applied across the heating electrodes, and T represents the time period during which the voltage is applied. In the case of a low temperature, the display effect of the liquid crystal display panel can be enhanced when the heating electrodes are used to heat the liquid crystal display panel, thus the liquid crystal display panel can be more widely used. Furthermore, the transparent conductive metal oxide film 3 between the color filter substrate 1 and the upper polarizer 4 can function to reduce the static electricity, thereby enhancing the resistance of the liquid crystal display panel to static electricity. Thus, the structures of enhancing the display effect at a low temperature and the antistatic performance may be integrated, such that the structure of the liquid crystal display panel is simplified and the cost is reduced.

Next, a method of manufacturing a liquid crystal display panel is described below with reference to FIGS. 7-9.

Figure 7:
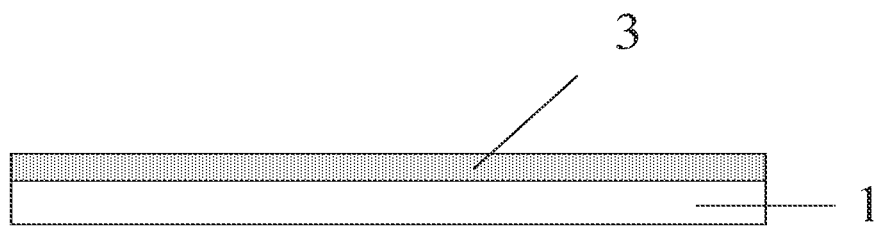
FIGS. 7-9 are side views of the color filter substrate prepared in various processing steps.

As shown in FIG. 7, a layer of transparent conductive metal oxide film 3 is substantially evenly formed on the color filter substrate 1 by, for example, sputtering, chemical vapor deposition, or thermal evaporation, etc. The transparent conductive metal oxide film 3 may be made of any one of or any combination of ITO, ZnO, IZO, and AZO. The thickness of the transparent conductive metal oxide film 3 may meet the requirement of the sheet resistance and the transmittance in use, and the transmittance depends on the brightness requirements of various products. In this embodiment, the sheet resistance of the transparent conductive metal oxide film 3 is in the range of about 3Ω/□ (ohm per square) to about 15Ω/□. In some embodiments, the sheet resistance of the transparent conductive metal oxide film 3 is about 10Ω/□.

Figure 8:
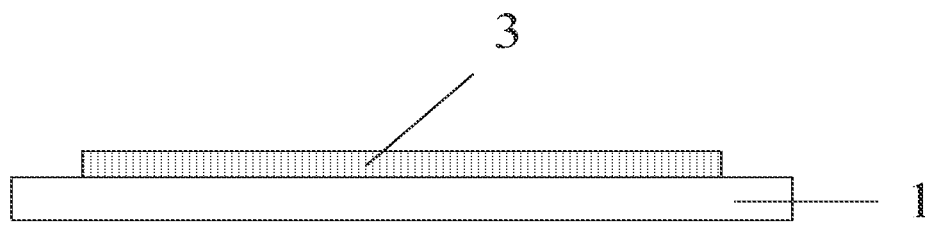

In this embodiment, transparent conductive metal oxide film 3 is patterned by etching away portions of the transparent conductive metal oxide film on two opposite edges of the color filter substrate 1. for example, the transparent conductive metal oxide film 3 may be etched by a distance of about 0.5 to about 1.0 mm toward the inner part of the color filter substrate 1 at each of the two edges of the color filter substrate 1, as shown in FIG. 8.

The conductive metal strips 5 may be formed on the regions from which the transparent conductive metal oxide film 3 has been etched away. The conductive metal strips 5 are connected electrically with the transparent conductive metal oxide film 3, as shown in FIG. 9. The conductive metal strips 5 may be made of, for example, silver paste or a titanium aluminum alloy. The width of the conductive metal strip 5 may be about 0.5 to about 1.0 mm.

Figure 9:
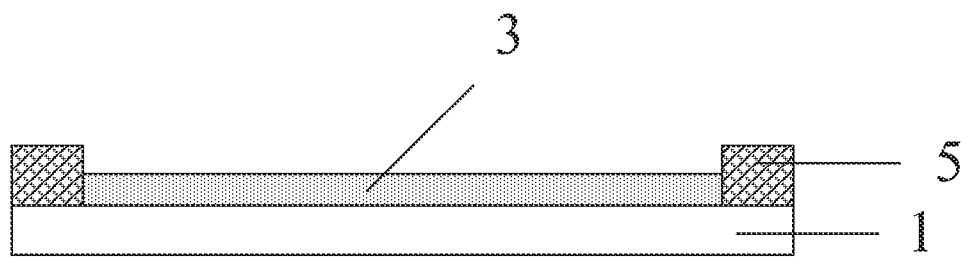

FIGS. 8 and 9 illustrate an arrangement where the conductive metal strips 5 are adjacent to two lateral sides of the transparent conductive metal oxide film 3 on the color filter substrate 1. In this arrangement, current may flow into the conductive metal strip at one side and flow out from the conductive metal strip at the other side. Alternatively, another portion of the edge of the transparent conductive metal oxide film 3 may be etched away, where the portion etched away includes two separate regions. Conductive metal strips may be formed on the regions where the transparent conductive metal oxide film is etched away. The conductive metal strips include two separate portions without a direct electrical connection therebetween, so that the current flows into one of the two portions and flow out from the other of the two portions.

In the case that the conductive metal strips 5 are made of silver paste, a layer of ultraviolet (UV) glue may be applied on the surface of the silver paste to enhance the reliability of the silver paste. The thickness of the conductive metal strips 5 may be greater than the thickness of the transparent conductive metal oxide film 3 sandwiched therebetween, and the polarizer 4 can be trimmed to preferably cover only over the transparent conductive metal oxide film 3. In the case that the conductive metal strips 5 are made of a titanium aluminum alloy, the thickness of the conductive metal strips 5 may be substantially the same as the thickness of the transparent conductive metal oxide film 3 sandwiched therebetween, and the polarizer 4 may be placed on both the transparent conductive metal oxide film 3 and the conductive metal strips 5.

The conductive metal strips 5 may be distributed evenly adjacent to two sides of the transparent conductive metal oxide film 3, which functions as a heating plate. The conductive metal strips 5 may function as two electrodes of the heating plate, such that the current is allowed to flow into the conductive metal strip 5 at one side, through the heating plate formed by the transparent conductive metal oxide film 3, and subsequently to flow out from the conductive metal strip 5 at the other side, thereby enhancing the evenness of the heat generated by the heating plate.

Next, an array substrate, such as array substrate 2 and the color filter substrate 1 are adhered together with a sealant, such as sealant 8, as shown in FIG. 3. In some embodiments, if array substrate 2 includes the stage portion 9, the transparent conductive metal oxide film 3 may be formed on the side surface of the color filter substrate 1 away from the liquid crystal layer, and the conductive metal strips 5 may be formed on the edge of the film 3. Subsequently, liquid crystal molecules (not shown) are injected between the array substrate 2 and the color filter substrate 1. Two heating electrodes 7-1 and 7-2 are formed at two ends of the stage portion 9, respectively. The heating electrodes 7-1 and 7-2 are connected electrically with the conductive metal strip 5 on the color filter substrate 1 through the conductive metal 6.

The conductive metal 6 may then be formed between the color filter substrate 1 and the array substrate 2, for example, by dropping silver paste, or by another method. The conductive metal 6 respectively forms an electrical connection between the two conductive metal strips 5 on the color filter substrate 1 and the two heating electrodes 7-1, 7-2 on the array substrate 2.

As a result, the evenness of the heat generated by the heating plate may be enhanced and the heating effect may be improved. Furthermore, the transparent conductive metal oxide film 3 may also function to dissipate static electricity to reduce potential damage which could be caused by the static electricity. As a result, the cost is reduced and the structure of the liquid crystal display panel is simplified.

Further, it is also possible to place a polarizer 4 on the side surface of the transparent conductive metal oxide film 3 away from the color filter substrate 1, as shown in FIG. 1. The polarizer 4 may cover only the transparent conductive metal oxide film 3.

It is noted that the above description illustrates certain embodiments and technical principles. It will be understood by those skilled in the art that the present embodiments are not intended to be limited to the particular features discussed herein, and various changes, rearrangements and substitutions can be made by the person skilled in the art. Therefore, although various aspects have been described in detail with reference to the presented embodiments, the invention is not limited to the presented embodiments and also can include the other embodiments.

What is claimed is:

1. A liquid crystal display panel, comprising:
   an array substrate;
   a color filter substrate arranged opposite to the array substrate; and
   a liquid crystal layer between the array substrate and the color filter substrate,
   wherein the color filter substrate comprises:
      a transparent conductive metal oxide film, and
      first and second conductive metal strips electrically connected with the transparent conductive metal oxide film, wherein the first and second conductive metal strips contact one or more side surfaces of the transparent conductive metal oxide film, wherein the side surfaces are substantially perpendicular to a plane generally defined by the transparent conductive metal oxide film, wherein the first and second conductive metal strips are configured to conduct a current, which flows through the transparent conductive metal oxide film, and wherein the current causes the transparent conductive metal oxide film to generate heat.

2. The liquid crystal display panel of claim 1, wherein the array substrate comprises first and second heating electrodes, each electrically connected with one of the first and second conductive metal strips of the color filter substrate through a conductive metal, wherein the current is conducted between the first and second conductive metal strips and the first and second heating electrodes.

3. The liquid crystal display panel of claim 1, wherein the color filter substrate comprises a polarizer on a surface of the transparent conductive metal oxide film opposite the array substrate.

4. The liquid crystal display panel of claim 1, wherein, the conductive metal strips comprise a titanium aluminum alloy or a silver paste.

5. The liquid crystal display panel of claim 3, wherein, a perimeter of the polarizer contacts a perimeter of the transparent conductive metal oxide film.

6. The liquid crystal display panel of claim 2, wherein, the conductive metal comprises silver paste.

7. The liquid crystal display panel of claim 2, wherein, the liquid crystal display panel is configured to receive a driving signal from an external circuit which transmits the driving signal to the liquid crystal display panel through the heating electrode in order cause the liquid crystal display panel to be heated.

8. The liquid crystal display panel of claim 7, wherein, the external circuit comprises a flexible printed circuit.

9. The liquid crystal display panel of claim 1, wherein, the transparent conductive metal oxide film comprises at least one of indium tin oxide, zinc oxide, indium, zinc oxide, and aluminum zinc oxide.

10. A method of manufacturing a liquid crystal display panel, the method comprising:
providing an array substrate;
forming a color filter substrate arranged opposite to the array substrate; and
filling a liquid crystal between the array substrate and the color filter substrate to form a liquid crystal layer;
wherein the color filter substrate comprises:
a transparent conductive metal oxide film, and
first and second conductive metal strips electrically connected with the transparent conductive metal oxide film, wherein the first and second conductive metal strips contact one or more side surfaces of the transparent conductive metal oxide film, wherein the side surfaces are substantially perpendicular to a plane generally defined by the transparent conductive metal oxide film, wherein the first and second conductive metal strips are configured to conduct a current, which flows through the transparent conductive metal oxide film, and wherein the current causes the transparent conductive metal oxide film to generate heat.

11. The manufacturing method of claim 10, wherein, the array substrate comprises first and second heating electrodes, each electrically connected with one of the conductive metal strips of the color filter substrate through a conductive metal, wherein the current is conducted between the first and second conductive metal strips and the first and second heating electrodes.

12. The manufacturing method of claim 10, wherein, the conductive metal strips comprise a titanium aluminum alloy or silver paste.

13. The manufacturing method of claim 10, wherein, wherein the color filter substrate comprises a polarizer on a surface of the transparent conductive metal oxide film opposite the array substrate.

14. The manufacturing method of claim 13, wherein, a perimeter of the polarizer contacts a perimeter of the transparent conductive metal oxide film.

15. The manufacturing method of claim 11, wherein, the conductive metal comprises silver paste, and the heating electrodes are connected with the conductive metal strips of the color filter substrate with the silver paste.

16. The manufacturing method of claim 10, wherein, the transparent conductive metal oxide film at least one of indium tin oxide, zinc oxide, indium zinc oxide, and aluminum zinc oxide.

17. A method of heating a liquid crystal display panel, the display panel comprising a liquid crystal layer and a color filter substrate including a transparent conductive metal oxide film, and first and second conductive metal strips electrically connected with the transparent conductive metal oxide film, wherein the first and second conductive metal strips contact one or more side surfaces of the transparent conductive metal oxide film, wherein the side surfaces are substantially perpendicular to a plane generally defined by the transparent conductive metal oxide film, the method comprising:
providing the liquid crystal display panel with a driving signal from an external circuit, the external circuit transmitting the driving signal through the first and second conductive metal strips and through the side surfaces of the transparent conductive metal oxide film, wherein the current causes the transparent conductive metal oxide film to heat the liquid crystal layer.

18. The method of claim 17, wherein, the external circuit is a flexible printed circuit.

* * * * *